US011483675B2

(12) United States Patent
Aleman et al.

(10) Patent No.: US 11,483,675 B2
(45) Date of Patent: Oct. 25, 2022

(54) VIBRATION-BASED TRACKING SYSTEM

(71) Applicant: Microchip Technology Incorporated, Chandler, AZ (US)

(72) Inventors: Enrique Aleman, Gilbert, AZ (US); Monte Denton, Gilbert, AZ (US); Keith Edwin Curtis, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 409 days.

(21) Appl. No.: 16/707,156

(22) Filed: Dec. 9, 2019

(65) Prior Publication Data

US 2021/0112372 A1 Apr. 15, 2021

Related U.S. Application Data

(60) Provisional application No. 62/913,239, filed on Oct. 10, 2019.

(51) Int. Cl.
*H04W 4/029* (2018.01)
*G01S 5/00* (2006.01)
(Continued)

(52) U.S. Cl.
CPC ............ *H04W 4/029* (2018.02); *B60N 3/044* (2013.01); *B60N 3/048* (2013.01); *G01S 5/0027* (2013.01); *G01S 5/14* (2013.01); *H04W 4/80* (2018.02)

(58) Field of Classification Search
CPC .... G01C 21/04; G01C 21/206; G06Q 10/087; G06Q 30/0201; G07C 5/008; G07C 9/00;
(Continued)

(56) References Cited

U.S. PATENT DOCUMENTS

2004/0093274 A1\* 5/2004 Vanska .............. G06Q 30/0631
705/26.7
2007/0276558 A1\* 11/2007 Kim ..................... G05D 1/0272
901/47
(Continued)

FOREIGN PATENT DOCUMENTS

EP 3547223 A1 10/2019 ............... G05D 1/02

OTHER PUBLICATIONS

International Search Report and Written Opinion, Application No. PCT/US2020/027361, 14 pages.

*Primary Examiner* — Marthe Y Marc-Coleman
(74) *Attorney, Agent, or Firm* — Slayden Grubert Beard PLLC

(57) ABSTRACT

A vehicle movement tracking system that employs floor mats having ridges for generating location information in the form of modulated vibrations, detectable with an accelerometer. Two sensors are in a wheel of a vehicle. One sensor senses wheel rotation, and the other sensor senses vertical acceleration. The vehicle passes over a floor mat comprising vertically elevated ridges thereon that code the mat and thereby indicate the location at which the mat is at. When the vehicle travels over this mat the vertical acceleration sensor in the wheel detects the vertically elevated ridges and the wheel rotation sensor detects the distance between the vertically elevated ridges. In combination these two sensors are used to create a location word that denotes the mat over which the vehicle passes over. The location word is stored in non-volatile memory and later uploaded to a location collection station.

21 Claims, 4 Drawing Sheets

(51) Int. Cl.
  *G01S 5/14*    (2006.01)
  *B60N 3/04*    (2006.01)
  *H04W 4/80*    (2018.01)

(58) Field of Classification Search
  CPC ...... G07C 5/0841; H04W 4/029; H04W 4/80;
       H04W 4/023; H04W 4/026; H04W 4/027;
       B60N 3/044; B60N 3/048; G01S 5/0027;
       G01S 5/14
  See application file for complete search history.

(56)    References Cited

U.S. PATENT DOCUMENTS

2014/0343846 A1   11/2014   Goldman et al. ............. 701/525
  2018/0178822 A1    6/2018   Carter et al.
  2019/0118845 A1    4/2019   Hannah et al.
  2019/0392185 A1*  12/2019   Martin ................. G06K 7/1404

* cited by examiner

US 11,483,675 B2

VIBRATION-BASED TRACKING SYSTEM

RELATED PATENT APPLICATION

This application claims priority to commonly owned U.S. Provisional Patent Application Ser. No. 62/913,239; filed Oct. 10, 2019; entitled "Vibration-Based Tracking System," and is hereby incorporated by reference herein for all purposes.

TECHNICAL FIELD

The present disclosure relates to tracking systems and, more particularly, to vibration-based tracking systems.

BACKGROUND

Tracking a vehicle's movement through a closed environment has been problematic, especially when trying to do so with low power implementations. Global Positioning System (GPS) has been used and works for higher power systems but requires continuous reception to maintain location information. Use of GPS is also problematic in steel building. Another tracking option has been to put bar codes on the floor, but they fail to be properly read due to dirt and wear that renders them unusable. Yet another tracking option has been to use energized magnetic coils in the floor to couple data to the vehicles, but this requires power and active circuitry in the floor. A vehicle is a thing used for transporting people, animals or goods, especially on land, such as for example but not limited to a car, truck or cart.

An application for tracking vehicles is the desire of retail stores to track shopping habits of its customers. It is important to retail stores to know which areas of marketing displays gather interest, and which areas capture interest, but the associated products don't sell. Which areas of the store have the most traffic, and which have the least. What areas of the store are congested and at what times?

SUMMARY

Therefore, what is needed is a low power, simple and cost-effective solution for tracking material and vehicles operating in a closed environment.

According to an embodiment, a vibration-based tracking system may comprise: a vehicle having wheels on a surface of a substrate that the vehicle travels over; a plurality of vertically elevated ridges on the substrate, wherein some of the vertically elevated ridges may be spaced a first distance and others of the vertically elevated ridges may be spaced a second distance, whereby the first distance represents a first logic value and the second distance represents a second logic value, and the first distance may be greater than the second distance; and one of the wheels of the vehicle may comprise a digital processor, a rotation sensor coupled to the digital processor, a vertical acceleration sensor coupled to the digital processor, a non-volatile memory coupled to the digital processor, a real-time clock coupled to the digital processor, a wireless communications device coupled to the digital processor, and a power source; wherein when the vertical acceleration sensor detects a vertically elevated ridge the digital processor may be notified and the rotation sensor provides a wheel rotation value until a next vertically elevated ridge may be detected, a first logic value may be determined when the wheel rotation value may be greater than a predetermined rotation value and a second logic value may be determined when the wheel rotation value may be not greater than the predetermined rotation value, the first or second logic value may be stored; and detection of another vertically elevated ridge and another next vertically elevated ridge continues for determining first or second logic values until the stored first and/or second logic values complete a location word, wherein the location word and an associated time stamp may be stored in the non-volatile memory.

According to a further embodiment, a microcontroller may provide the digital processor, non-volatile memory, and real-time clock. According to a further embodiment, the vertical acceleration sensor may comprise a single-axis giant magnetoresistance (GMR) sensor. According to a further embodiment, the rotation sensor may comprise a two-axis giant magnetoresistance (GMR) sensor. According to a further embodiment, may comprise a location collection station for uploading the stored location words and associated time stamps, wherein when the vehicle travels over an upload coded substrate the stored location words and associated time stamps may be sent via the wireless communications device to the location collection station. According to a further embodiment, the wireless communications device may use LoRa communications. According to a further embodiment, the wireless communications device may use communications selected from the group consisting of Wi-Fi, Bluetooth, Zigbee and Z-Wave. According to a further embodiment, the first logic level may be a logic "0" and the second logic level may be a logic "1". According to a further embodiment, the first logic level may be a logic "1" and the second logic level may be a logic "0". According to a further embodiment, the vehicle may be selected form the group consisting of shopping cart, grocery cart, materials handling vehicle, fork-lift, hand cart, hand truck, platform truck, wheelbarrow and transportation vehicle.

According to another embodiment, a method for tracking a vehicle using a vibration-based tracking system may comprise the steps of: detecting vertically elevated ridges on a substrate with a vertical acceleration sensor located in a wheel of a vehicle rolling over the vertically elevated ridges; measuring angular rotations of the wheel between occurrences of the detected vertically elevated ridges; comparing each of the measured angular rotations to a predetermined angular rotation value, wherein if the measured angular rotation may be great than the predetermined angular rotation value then store a first logic value into a location word, and if not greater than the predetermined angular rotation value then store a second logic value into the location word until complete; and time stamping the completed location word and storing the time in a non-volatile memory.

According to a further embodiment of the method, may comprise the step of storing a plurality of completed location words and respective time stamps representing where and when the vehicle rolled over a plurality of substrates at different locations. According to a further embodiment of the method, may comprise the step of uploading the plurality of completed location words and respective time stamps to a location collection station. According to a further embodiment of the method, the step of uploading the plurality of completed location words and respective time stamps may comprise the step of uploading the plurality of completed location words and respective time stamps to the location collection station when an upload location word may be determined after the vehicle wheel passes over an upload coded location substrate. According to a further embodiment of the method, the step of uploading the plurality of completed location words and respective time stamps may comprise the step of uploading the plurality of completed location words and respective time stamps to the location collection station when the wheel of the vehicle may be proximate thereto. According to a further embodiment of the method, the first logic level may be a logic "0" and the second logic level may be a logic "1". According to a further embodiment of the method, the first logic level may be a logic "1" and the second logic level may be a logic "0". According to a further embodiment of the method, wherein the substrate may be moveable to different locations. According to a further embodiment of the method, the plurality of substrates may be a plurality of mats, wherein the plurality of mats may be moveable to different locations. According to a further embodiment of the method, may comprise the step of date stamping the completed location word and storing the date in the non-volatile memory. According to a further embodiment of the method, the moveable substrate may be a mat.

BRIEF DESCRIPTION OF THE DRAWINGS

A more complete understanding of the present disclosure may be acquired by referring to the following description taken in conjunction with the accompanying drawings wherein.

Figure 1:
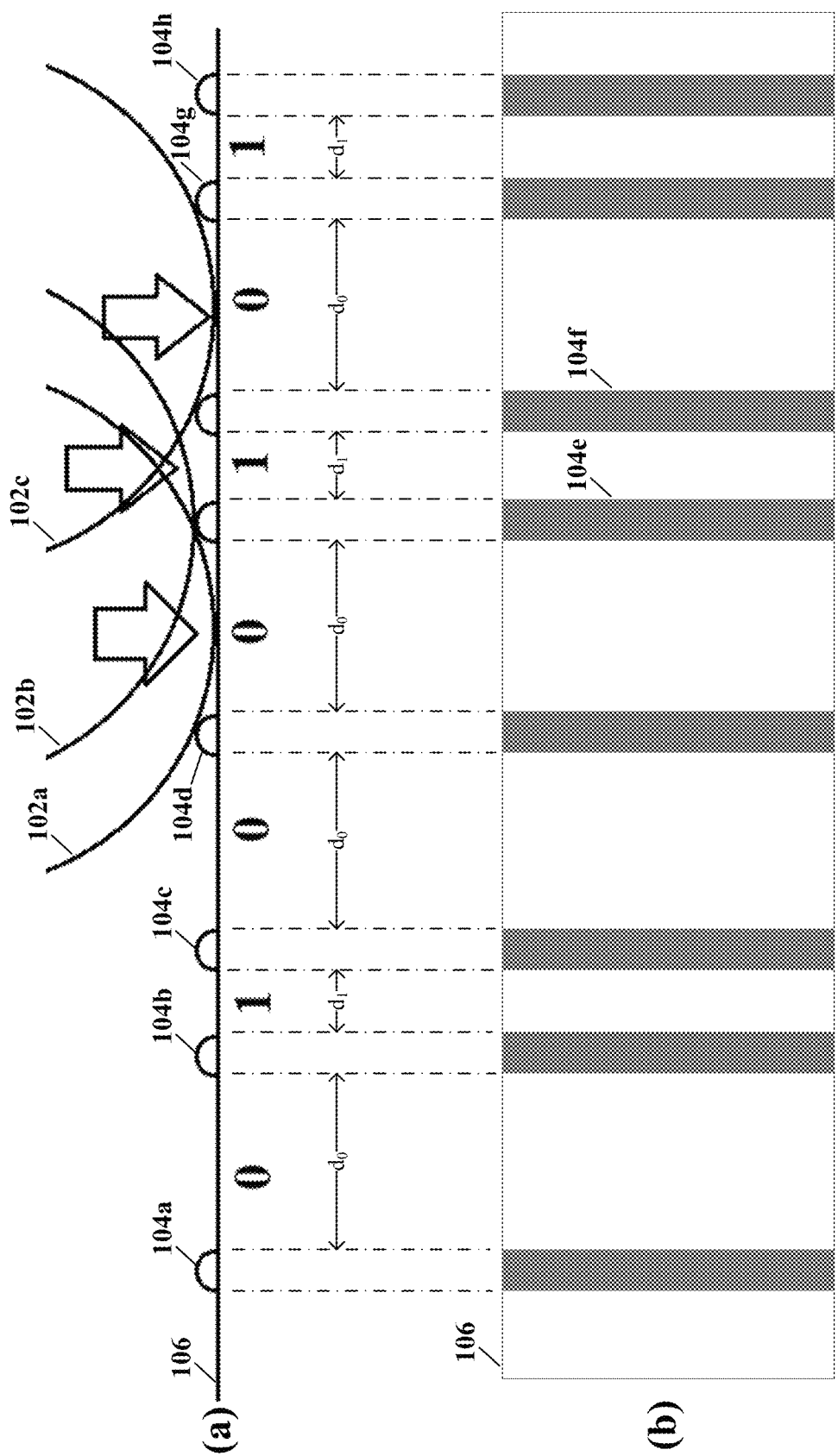
FIG. 1 illustrates schematic elevational and plan views of a vibration inducing mat and vibration sensing wheel for vehicle location tracking, according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

Embodiments of the present disclosure comprise two sensors located in a wheel of a vehicle. One sensor senses wheel rotation, and the other sensor senses vertical acceleration. The vehicle passes over a mat (substrate) on a floor comprising vertically elevated ridges thereon that may be used to code the mat and thereby the location where the mat is at. When the vehicle travels over this mat, the vertical acceleration sensor in the wheel detects the vertically elevated ridges and in combination with the information from the wheel rotation sensor decodes these vertically elevated ridges into binary values that denote the mat over which the vehicle is passing, recorded in the vehicle wheel and later downloaded (read electronically) to determine where and when the vehicle was at. It is contemplated and within the scope of this disclosure that a vehicle having at least one wheel may comprise a shopping cart, grocery cart, materials handling vehicle, e.g., fork-lift, hand cart, hand truck, platform truck, wheelbarrow; and transportation vehicle. The vertically elevated ridges may be on a substrate such as a floor or a mat located on the floor that may be movable to different locations.

The two sensors and associated electronics are in one wheel of the vehicle and may be sealed against contamination. The sensor and location collection electronics may operate at the least power necessary for operation thereof and need only store data when the vertically elevated ridges defining the coded mat and location thereof are detected. A particular location word may be used to trigger a wireless transmission of accumulated locations to a data collection receiver for further processing thereof. Wireless charging of a battery in the wheel for powering the wheel sensor and location collection electronics may also be implemented at storage locations for the vehicle.

The embodiments of the present disclosure are simple to implement and very cost effective. No modifications to the vehicle are required except to replace one of its wheels with a vibration sensing wheel as described hereinabove. The mats having vertically elevated ridges thereon may be molded and be easily repositioned as location detection requirements change. The embodiments described herein may be easily scaled from small vehicles such as shopping carts to large vehicles such as trucks.

Advantages of the embodiments disclosed herein are that the active electronics are only required in one wheel of each vehicle, and at the data collection receiver. Location coding mats may be passive, and locations thereof may be reprogrammed by physically moving a mat to a new location. The electronics have low power requirements because the location determination may be based upon binary digits determined by wheel rotation triggered by acceleration (ridge) detection. Therefore, most of the wheel electronics may be in a low power sleep mode most of the time with a comparator and accelerometer the only continuously active electronic components in the wheel. Transmission of stored locations may occur when the vehicle wheel runs over a specifically coded mat, when the vehicle wheel is proximate to a location collection receiver, and/or a RF interrogation signal from the location collection receiver is received by the "smart wheel."

Referring now to the drawings, the details of example embodiments are schematically illustrated. Like elements in the drawings will be represented by like numbers, and similar elements will be represented by like numbers with a different lower-case letter suffix.

Referring to FIG. 1, depicted are schematic elevational and plan views of a vibration inducing mat and vibration sensing wheel for vehicle location tracking, according to specific example embodiments of this disclosure. A drawing (a) shows an elevational view of a mat 106 having raised ridges 104a, 104b . . . 104h, generally 104, spaced apart either by distant do or $d_1$, where $d_0$ is greater than $d_1$. A drawing (b) shows a plan view of the mat 106. A wheel 102 is shown at three different positions represented by wheels 102a, 102b, 102c, each of which indicate a different position for the wheel 102, as it rolls over the raised ridges 104 and is accelerated up or down depending upon its positional relationship with a ridge(s) 104 proximate thereto. By detecting when the wheel 102 accelerates vertically, either up or down, and the amount of wheel rotation between detections of the vertical accelerations, logic "1s" and "0s" may be decoded from the mat 106. A location word may be formed from the decoded logic 1s and 0s. For example, when traversing from raised ridge 104a to 104b, i.e., over distance $d_0$, a logic 0 may be recorded, without limitation. When traversing from raised ridge 104b to 104c, i.e., over distance $d_1$, a logic 1 may be recorded, without limitation. This location word may be unique to a particular mat 106 and the location of the mat 106 will correlate to the location of the vehicle when it passes over the mat 106. Electronics in the wheel 102 may time (and date) stamp the location word indicating the time/date at which the wheel 102 passed over the particular mat 106. A plurality of such location words may be stored in the electronics of the wheel 106 to later be downloaded to a location collection receiver. In this way the vehicle location usage may be determined. The location word may further identify the direction of travel, since a different location word may be recorded for travel from ridge 104*h* towards ridge 104*a* that the location word recorded for travel from ridge 104*a* towards ridge 104*h*.

Figure 2:
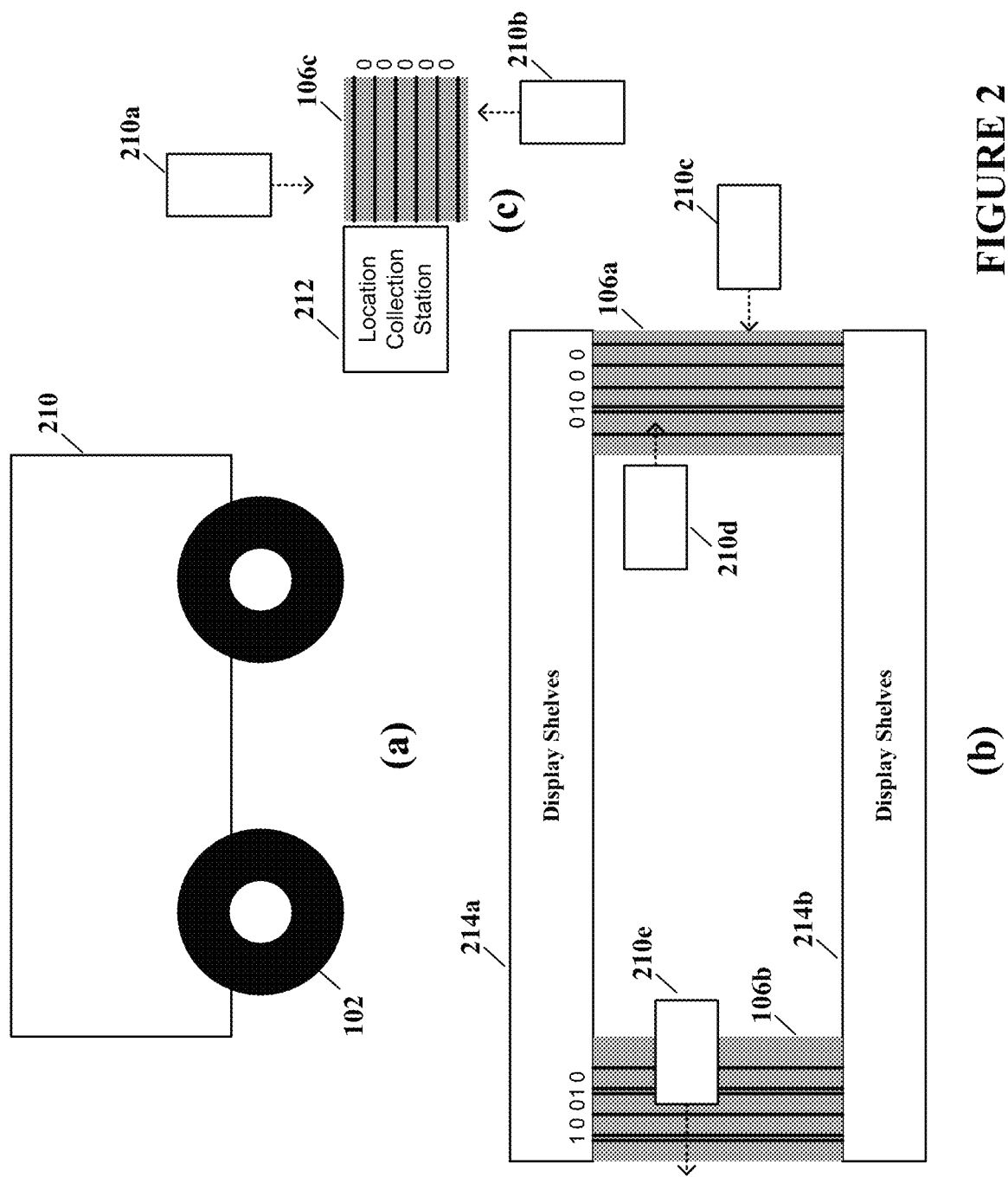
FIG. 2 illustrates schematic plan views of vibration inducing substrates and vehicles each having a vibration sensing wheel and an elevational view of a vehicle with a vibration sensing wheel, according to specific example embodiments of this disclosure.

Referring to FIG. 2, depicted are schematic plan views of vibration inducting mats and vehicles each having a vibration sensing wheel and an elevational view of a vehicle with a vibration sensing wheel according to specific example embodiments of this disclosure. A plurality of mats 106 may be arranged in a store, for example but not limited to, at each end of two rows of display or product shelves 214 so that when a vehicle 210*c* comes into this shelf area a mat 106*a* will cause the vehicle 210*c* to record a location word 01000, e.g., first set of ridges 104 detected may be the least significant bit (LSB) and the last set of ridges 104 detected may be the most significant bit (MSB), or vice versa. When a vehicle 210*d* leaves this area the mat 106*a* will be decoded as 00010, thus indicating which direction the vehicle 210 was traveling (in or out of area). Mat 106*b* provides tracking of vehicles coming in and going out of the shelve area, and the location code may be 01001 going out and 10010 going in.

A location collection station 212 may be used to retrieve the time stamped recorded location words from each vehicle 210 that passes over the mat 106*c*. When a vehicle 210*a* passes over the mat 106*c* a location word 00000 will be detected and the vehicle 210*a* may be programed to upload its time stamped recorded location words upon detection of that code. As indicated above, detection of the ridges 104 may be triggered by acceleration (ridge) detection of a leading edge and/or a trailing edge of each ridge 104. Vehicle 210*b* will also detect the location word 00000 going over the mat 106*c* in the other direction, and thereafter upload its stored location words comprising the location history traveled by the vehicle 210.

Figure 3:
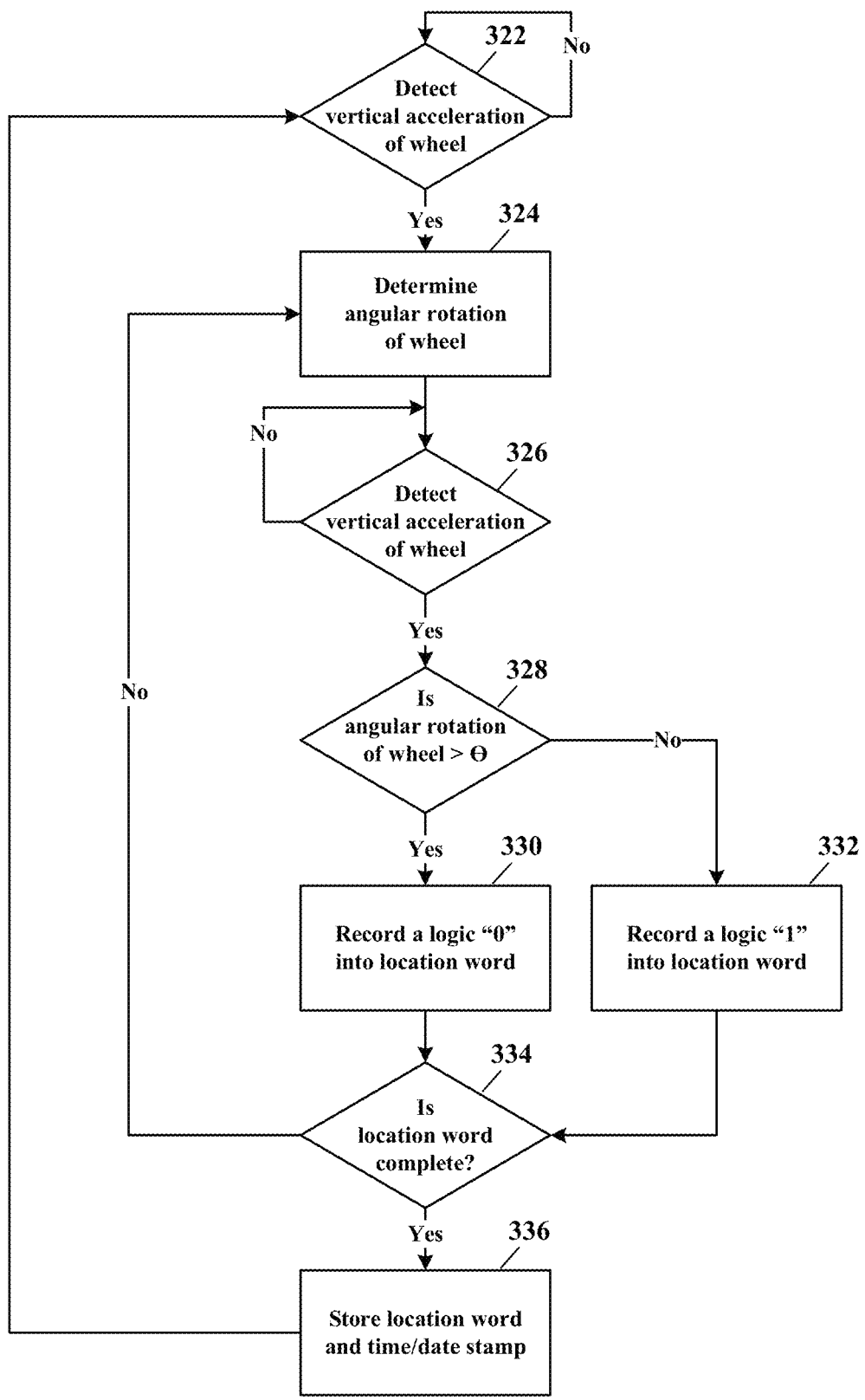
FIG. 3 illustrates a schematic flow diagram for recording location words from the vibration sensing wheel, according to specific example embodiments of this disclosure.

Referring to FIG. 3, depicted is a schematic flow diagram for recording location words from the vibration sensing wheel, according to specific example embodiments of this disclosure. In step 322 the electronics in the wheel 102 becomes active upon detection of vertical acceleration of the wheel 102. Preferably acceleration is detected only in relation to one of the leading edge and/or trailing edge of each ridge 104, which is defined by the direction of acceleration. In step 324 the angular rotation of the wheel 102 is determined until in step 326 another vertical acceleration is detected, preferably of the same direction. In step 328 the determined angular rotation of the wheel 102 is compared to a predetermined angular rotation value, $\theta$, and if great than the angular rotation value, $\theta$, then go to step 330. If not greater than the predetermined angular rotation value, $\theta$, then go to step 332.

Step 330 records a logic "0" into a location word, and step 332 records a logic "1" into the location word. Step 334 determines if enough logic bits have been recorded from steps 330 and/or 332. If so, in step 336 the location word is stored along with a time (and date) stamp into a memory, e.g., non-volatile memory. If not, then return to step 324 for further processing of angular rotation of the wheel (step 324) and detection of vertical acceleration (step 326). It is contemplated and within the scope of this disclosure that the first logic bit input for the location word may be a least significant bit (LSB) and the last logic bit input for the location word may be a most significant bit (MSB), without limitation, and thus in other embodiments the first logic bit input for the location word may be a MSB and the last logic bit input for the location word may be a LSB. In addition to the above, various additional method steps may be provided, such as a watch dog timer, or the loading of an error code into a location word in the event that at least one bit is not detected after the angular rotation is determined as exceeding a threshold significantly greater than the angular rotation value, $\theta$, indicative that at least one bit has been missed, due for example to wear of the floor mat ridges.

Figure 4:
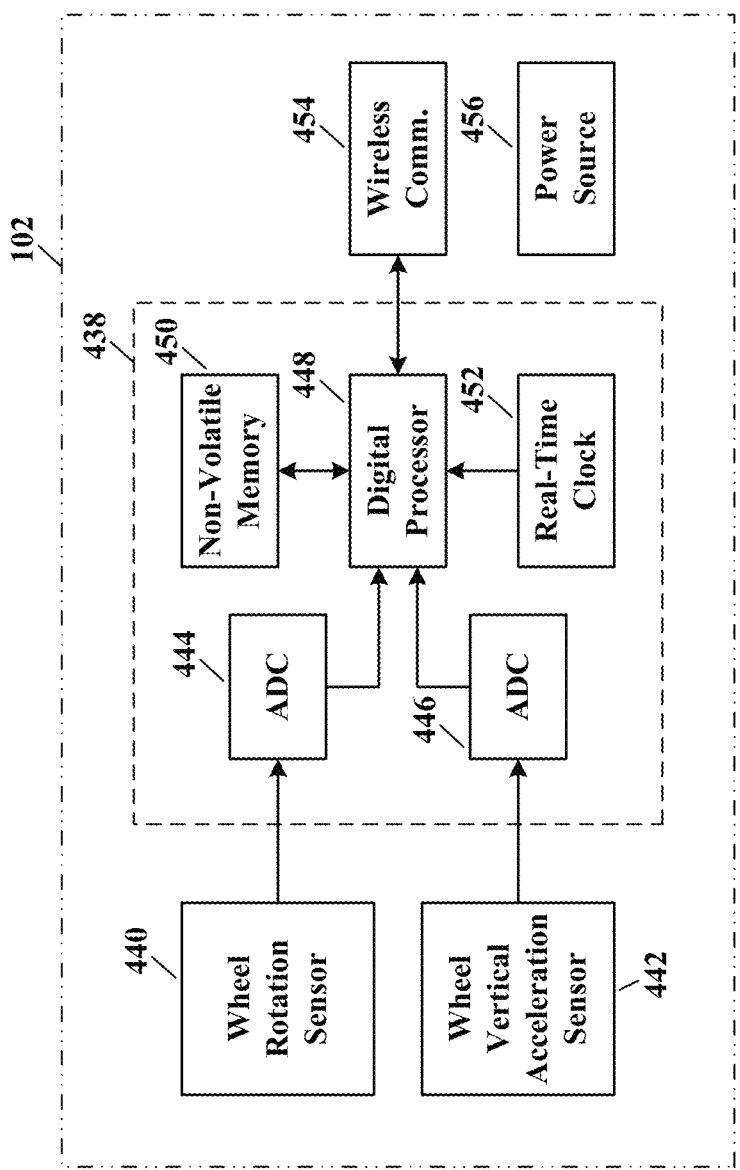
FIG. 4 illustrates a schematic block diagram of an electronic circuit implementation for a vibration sensing wheel, according to specific example embodiments of this disclosure.

Referring to FIG. 4, depicted is a schematic block diagram of an electronic circuit implementation for a vibration sensing wheel, according to specific example embodiments of this disclosure. The electronics in a vibration sensing wheel 102 may comprise a wheel rotation sensor 440, a wheel vertical acceleration sensor 442, analog-to-digital converters (ADC) 444 and 446, a digital processor 448, non-volatile memory 450, a real time clock 452, wireless communications 454, and a power source 456. The wheel rotation sensor 440 and the wheel vertical acceleration sensor 442 may have analog or digital outputs. If digital, then the associated ADC 444 or 446 is (are) not necessary and a digital input to the digital processor 448 will suffice. A microcontroller 438 may be used to provide circuit functions 444-450 and may even provide wireless communications 454. The wheel rotation sensor/detector 440 may comprise, for example but is not limited to, a two-axis giant magnetoresistance (GMR) sensor. The wheel acceleration sensor/detector 442 may comprise, for example but is not limited to, a single-axis giant magnetoresistance (GMR) sensor. The wireless communications 454 may be, for example but is not limited to, LoRa (Long Range), Wi-Fi, Bluetooth, Zigbee, Z-Wave, cell, etc.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:
1. A vibration-based tracking system, said system comprising:
   a vehicle having wheels on a surface of a substrate that the vehicle travels over;
   a plurality of vertically elevated ridges on the substrate, wherein some of the vertically elevated ridges are spaced a first distance and others of the vertically elevated ridges are spaced a second distance, whereby the first distance represents a first logic value and the second distance represents a second logic value, and the first distance is greater than the second distance; and
   one of the wheels of the vehicle comprises
      a digital processor,
      a rotation sensor coupled to the digital processor, a vertical acceleration sensor coupled to the digital processor, a non-volatile memory coupled to the digital processor, a real-time clock coupled to the digital processor, a wireless communications device coupled to the digital processor, and a power source;

wherein when the vertical acceleration sensor detects a vertically elevated ridge the digital processor is notified and the rotation sensor provides a wheel rotation amount value until a next vertically elevated ridge is detected, a first logic value is determined when the wheel rotation amount value is greater than a predetermined rotation value and a second logic value is determined when the wheel rotation amount value is not greater than the predetermined rotation value, the first or second logic value is stored; and detection of another vertically elevated ridge and another next vertically elevated ridge continues for determining first or second logic values until the stored first and/or second logic values complete a location word, wherein the location word is associated with a particular location on the substrate, and the location word and an associated time stamp are stored in the non-volatile memory.

2. The vibration-based tracking system according to claim 1, wherein a microcontroller provides the digital processor, non-volatile memory, and real-time clock.

3. The vibration-based tracking system according to claim 1, wherein the vertical acceleration sensor comprises a single-axis giant magnetoresistance (GMR) sensor.

4. The vibration-based tracking system according to claim 1, wherein the rotation sensor comprises a two-axis giant magnetoresistance (GMR) sensor.

5. The vibration-based tracking system according to claim 1, further comprising a location collection station for uploading the stored location words and associated time stamps, wherein when the vehicle travels over an upload coded substrate the stored location words and associated time stamps are sent via the wireless communications device to the location collection station.

6. The vibration-based tracking system according to claim 1, wherein the wireless communications device uses LoRa communications.

7. The vibration-based tracking system according to claim 1, wherein the wireless communications device uses communications selected from the group consisting of Wi-Fi, Bluetooth, Zigbee and Z-Wave.

8. The vibration-based tracking system according to claim 1, wherein the first logic level is a logic "0" and the second logic level is a logic "1".

9. The vibration-based tracking system according to claim 1, wherein the first logic level is a logic "1" and the second logic level is a logic "0".

10. The vibration-based tracking system according to claim 1, wherein the vehicle is selected form the group consisting of shopping cart, grocery cart, materials handling vehicle, fork-lift, hand cart, hand truck, platform truck, wheelbarrow and transportation vehicle.

11. A method for tracking a vehicle using a vibration-based tracking system, said method comprising the steps of:

detecting vertically elevated ridges on a substrate with a vertical acceleration sensor located in a wheel of a vehicle rolling over the vertically elevated ridges;

measuring angular rotations of the wheel between occurrences of the detected vertically elevated ridges;

comparing each of the measured angular rotations to a predetermined angular rotation value, wherein if the measured angular rotation is greater than the predetermined angular rotation value then store a first logic value into a location word, and if the measured angular rotation is not greater than the predetermined angular rotation value then store a second logic value into the location word until the location word is complete, wherein the location word is associated with a particular location on the substrate; and time stamping the completed location word and storing the time stamped completed location word in a non-volatile memory.

12. The method according to claim 11, further comprising the step of storing a plurality of completed location words and respective time stamps representing where and when the vehicle rolled over a plurality of substrates at different locations.

13. The method according to claim 12, further comprising the step of uploading the plurality of completed location words and respective time stamps to a location collection station.

14. The method according to claim 13, wherein the step of uploading the plurality of completed location words and respective time stamps comprises the step of uploading the plurality of completed location words and respective time stamps to the location collection station when an upload location word is determined after the vehicle wheel passes over an upload coded location substrate.

15. The method according to claim 13, wherein the step of uploading the plurality of completed location words and respective time stamps comprises the step of uploading the plurality of completed location words and respective time stamps to the location collection station when the wheel of the vehicle is proximate thereto.

16. The method according to claim 12, wherein the plurality of substrates are a plurality of mats, wherein the plurality of mats are moveable to different locations.

17. The method according to claim 11, wherein the first logic level is a logic "0" and the second logic level is a logic "1".

18. The method according to claim 11, wherein the first logic level is a logic "1" and the second logic level is a logic "0".

19. The method according to claim 11, wherein the substrate is moveable to different locations.

20. The method according to claim 19, wherein the moveable substrate is a mat.

21. The method according to claim 11, further comprising the step of date stamping the completed location word and storing the date in the non-volatile memory.

* * * * *